United States Patent [19]

Adlaf

[11] 3,837,346

[45] Sept. 24, 1974

[54] FOLEY CATHETER CONTAINING CHOLESTEROL

[75] Inventor: Paul C. Adlaf, Park Ridge, Ill.

[73] Assignee: The Kendall Company, Walpole, Mass.

[22] Filed: Feb. 12, 1973

[21] Appl. No.: 331,771

[52] U.S. Cl. .............................. 128/349 R, 117/139
[51] Int. Cl. ............................................. A61m 25/00
[58] Field of Search ............ 128/348, 349 R, 350 R, 128/351, 343, 239; 117/167, 139

[56] References Cited
UNITED STATES PATENTS

| | | | |
|---|---|---|---|
| 2,096,296 | 10/1937 | Fromm | 128/349 R X |
| 2,313,703 | 3/1943 | Hanna | 117/167 |
| 2,863,453 | 12/1958 | Gewecke | 128/227 |
| 3,434,869 | 3/1969 | Davidson | 128/349 R X |
| 3,674,524 | 7/1972 | Littlepage | 117/167 X |

OTHER PUBLICATIONS

Remington – Pharmacological Sciences – 1965, pp. 1417–1423.

*Primary Examiner*—Dalton L. Truluck
*Attorney, Agent, or Firm*—Ellen P. Trevors

[57] ABSTRACT

The incorporation of cholesterol in natural rubber Foley catheters results in an improved resistance to urinary salt calcification.

2 Claims, No Drawings

FOLEY CATHETER CONTAINING CHOLESTEROL

This invention relates to a natural rubber urinary catheter having cholesterol incorporated therein. More particularly, this invention relates to improving the resistance of rubber Foley catheters to urinary salt calcification during long-term catheterizations.

Rubber Foley catheters have been used for many years in urethral catheterizations. However, continuous long-term catheterizations are often unsuccessful because of the severity of urinary salt deposits (calculus) which adhere to the outside and luminal surfaces of the rubber Foley catheter. Consequently, because recatheterizations become necessary, the attendant risks of urinary tract infection and tissue irritation are maximized.

In order to minimize the buildup of calculus and allow long-term catheterization to become a reality, catheters manufactured entirely of a plastic material such as disclosed in U.S. Pat. Nos. 3,528,869; 3,539,674 and 3,544,668 were developed. Another approach was to apply a surface layer coating of an elastomeric silicone material such as dimethylpolysiloxane to natural rubber catheters. This process and catheter are more fully described in U.S. Pat. No. 3,434,869. Although some plastic and coated natural rubber catheters are reasonably effective in minimizing calculus buildup, they lack the resiliency and superior handling characteristics of catheters made of natural rubber which urologists traditionally prefer.

Now it has been found that an anti-calcification property is conferred on an indwelling rubber urinary catheter by incorporating cholesterol into the rubber matrix, which constitutes the substance of the catheter, without impairing the essential properties of the natural rubber. The cholesterol can be incorporated throughout the entire catheter but for the purpose of this invention, must be incorporated in at least that portion of the shaft intended for insertion into the body cavity.

For the purpose of this invention, it is not necessary that the cholesterol be incorporated in a homogeneous manner. For example, while it is not desired to be bound by theory, there appears to be a migration of the incorporated cholesterol to the surfaces of the catheter after incorporation. Therefore, it is intended to include a coating of cholesterol on the natural rubber catheter surfaces within the scope of this invention.

More specifically, cholesterol can be incorporated into the rubber matrix by any convenient method, for example, by stirring a slurry of cholesterol in water into the natural rubber latex prior to manufacture or by impregnating the finished catheter by immersing in a solution of cholesterol in a rubber-swelling solvent. By "rubber-swelling solvent" is meant an organic solvent for which rubber has a natural affinity and, upon immersion, causes the rubber to expand.

More in detail in the latter process mentioned above, the catheter is immersed in the solution for a period of time sufficient to impart the desired percentage of cholesterol to the rubber. After the immersion period, the rubber-swelling solvent is removed by conventional drying techniques.

Some rubber-swelling solvents which can be employed in this process are benzene, chloroform, xylene, carbon tetrachloride or methylene chloride. Generally, an immersion of from 10–20 minutes in a 5–10 percent (w/v) of cholesterol in a dry, pure, rubber-swelling solvent is sufficient to impregnate a rubber catheter with from 2–20 percent by weight cholesterol, which concentrations have proven to be effective in reducing calculus buildup. By the term "(w/v)" is meant a weighed amount of solute per 100 ml. of solution, as in this instance 5–10 grams of cholesterol per 100 ml. of solution. A range of 10–12 percent by weight cholesterol in the rubber matrix is considered optimum. As previously indicated, the cholesterol must be present in at least that portion of the shaft intended for insertion into the body cavity.

As mentioned above, the percentage of cholesterol incorporated into the rubber matrix is controlled by the concentration of cholesterol in the rubber-swelling solvent and the time the catheter is immersed therein. To obtain the optimum range of cholesterol in the rubber matrix (10–12 percent), an immersion time of 45 minutes in a 5 percent solution of cholesterol in benzene is generally sufficient. Although the mechanism of how cholesterol limits the buildup of calculus is not completely understood, it is hypothesized that it provides unfavorable sites for the deposit of urinary salts.

The procedures employed for demonstrating the efficacy of this invention and a comparison of tissue irritation between treated and untreated catheters are set forth in the following examples.

EXAMPLE 1

Previously weighed 12 French rubber Foley catheters were set into glass tubes, each tube being 50 cm. in length and having a 14 mm. inside diameter, so that the Y or fork of the catheter rested on the lip of the tube. A 5.0 percent solution (w/v) of cholesterol in benzene was added to each tube so that the desired length of catheter shaft would be immersed. (For these experiments, at least that length of shaft which would be inserted into the body cavity of the test animal was immersed.) The catheter shafts were left immersed for varying lengths of time, removed from the impregnating solution, dried in air overnight at room temperature and then dried under vacuum (0.1 mmHg) to remove the benzene. The catheters were then weighed again and the percent cholesterol in the impregnated portion of the shaft was calculated, taking into account the amount of rubber extractables in certain instances. (The varying conditions and percentages of impregnant for each catheter are reported in Table I.)

These cholesterol impregnated catheters were then used to catheterize white, male rabbits. After 7 days of catheterization, the animals were sacrificed and the catheters removed without deflation, dried in air at room temperature for at least 2 days and the relative calcification of each catheter was scored visually using the following scale:

```
0 = no calcification, catheter is clean
1 = light calcification
2 = moderate calcification
3 = severe calcification
```

Separate evaluations for the balloon and shaft areas were performed and then a composite evaluation of the entire external surface was also made. (Composite evaluations are reported in Table I.)

The catheter was then cut lengthwise from the eyes to the end of the impregnated segment using a pair of sharp scissors. After at least two days of drying in air at room temperature, the lumen (interior or drainage area) was examined using the aforementioned relative calcification scale. (See Table I for lumen scores.)

TABLE I

| Sample | Percent by Weight Cholesterol in Impregnated Portion of Catheter | Length Impregnated | Time Immersed Minutes | Time in vacuo (Hrs.) | Calculus Composite | Scores Lumen |
|---|---|---|---|---|---|---|
| 1 | Not Calculated | 9 cm. | 120 | Unknown | 2 | 1 |
| 2 | 11.1 | 25 cm. | 90 | 52 | 0 | 0 |
| 3 | 12.2 | 25 cm. | 90 | 52 | 0 | 1 |
| 4 | 15.5 | 25 cm. | 90 | 120 | 0 | 0 |
| 5 | 16.3 | 25 cm. | 90 | 120 | 1 | 1 |
| 6 | 14.7 | 25 cm. | 90 | 120 | 0 | 0 |
| 7 | 14.3 | 25 cm. | 90 | 120 | 0 | 0 |
| 8 | 14.4 | 25 cm. | 90 | 120 | 1 | 3 |
| 9 | 13.0 | 25 cm. | 60 | 96 | 1 | 1 |
| 10 | 12.6 | 25 cm. | 60 | 96 | 1 | 1 |
| 11 | 12.8 | 25 cm. | 60 | 96 | 0 | 0 |
| 12 | 12.7 | 25 cm. | 60 | 96 | 0 | 1 |
| 13 | 13.0 | 25 cm. | 60 | 96 | 0 | 1 |
| 14 | 16.3 | 15 cm. | 60 | 95 | 1 | 2 |
| 15 | 16.7 | 15 cm. | 60 | 95 | 1 | 1 |
| 16 | 4.7 | 25 cm. | 10 | 72 | 1 | 1 |
| 17 | 4.8 | 25 cm. | 15 | 72 | 0 | 0 |
| 18 | 5.7 | 25 cm. | 20 | 72 | 0 | 0 |

EXAMPLE 2

Using a 5 percent by weight solution of cholesterol in chloroform, the previously described impregnation process and rabbit catherizations were repeated with another group of rubber Foley catheters. (The conditions, percentages of impregnant and relative evaluations are reported in Table II.)

TABLE II

| Sample | Percent by Weight Cholesterol in Impregnated Portion of Catheter | Length Impregnated | Time Immersed Minutes | Time in vacuo (Hrs.) | Calculus Composite | Scores Lumen |
|---|---|---|---|---|---|---|
| 1 | 2.4 | 25 cm. | 5 | 72 | 0 | 0 |
| 2 | 3.4 | 25 cm. | 7 | 72 | 1 | 1 |
| 3 | 5.1 | 25 cm. | 10 | 72 | 1 | 1 |
| 4 | 7.7 | 25 cm. | 20 | 72 | 0 | 1 |
| 5 | 8.6 | 25 cm. | 25 | 72 | 1 | 1 |
| 6 | 10.0 | 25 cm. | 30 | 72 | 1 | 1 |
| 7 | 15.2 | 20 cm. | 60 | 192 | 1 | 3 |
| 8 | 12.5 | 20 cm. | 60 | 192 | 2 | 2 |
| 9 | 13.2 | 20 cm. | 60 | 192 | 2 | 1 |
| 10 | 11.0 | 20 cm. | 60 | 192 | 3 | 2 |
| 11 | 15.8 | 25 cm. | 60 | 96 | 0 | 0 |
| 12 | 15.5 | 25 cm. | 60 | 96 | 0 | 1 |
| 13 | 15.9 | 25 cm. | 60 | 96 | 2 | 2 |
| 14 | 15.9 | 25 cm. | 60 | 96 | 3 | 3 |
| 15 | 18.6 | 15 cm. | 60 | 95 | 3 | 3 |
| 16 | 19.1 | 15 cm. | 60 | 95 | 3 | 3 |

Controls

Thirty-two 12 French regular, untreated Rubber Foley catheters were used as controls. These control catheters were also used to catheterize white, male rabbits for 7 days and also evaluated according to the previously described relative evaluation procedure (the results are given in Table III).

TABLE III

| Control Catheters | | |
|---|---|---|
| | Calculus Scores | |
| Sample | Composite | Lumen |
| C1 | 3 | Not Observed |
| C2 | 3 | Not Observed |
| C3 | 3 | Not Observed |
| C4 | 3 | Not Observed |
| C5 | 3 | Not Observed |
| C6 | 3 | Not Observed |
| C7 | 3 | Not Observed |
| C8 | 2 | Not Observed |
| C9 | 2 | Not Observed |
| C10 | 2 | Not Observed |
| C11 | 1 | Not Observed |
| C12 | 0 | Not Observed |
| C13 | 1 | 1 |
| C14 | 2 | 2 |
| C15 | 2 | 2 |
| C16 | 3 | 2 |
| C17 | 3 | 3 |
| C18 | 3 | 3 |
| C19 | 3 | 3 |
| C20 | 3 | 3 |
| C21 | 3 | 3 |
| C22 | 3 | 3 |

TABLE III—Continued

Control Catheters

| Sample | Calculus Scores | |
|---|---|---|
| | Composite | Lumen |
| C23 | 3 | 3 |
| C24 | 3 | 3 |
| C25 | 3 | 2 |
| C26 | 3 | 3 |
| C27 | 2 | 1 |
| C28 | 3 | 2 |
| C29 | 3 | 3 |
| C30 | 3 | 3 |
| C31 | 3 | 3 |
| C32 | 3 | 3 |

Score averages and standard deviations were computed for each group, i.e. impregnated from benzene, impregnated from chloroform and the controls. (These results are tabulated in Table IV.)

0 = fibroblastic reaction only
1 = leucocytic reaction and fibroblastic tissue
2 = fibroblastic reaction and slight leucocytic reaction around implant within capsule
3 = fibroblastic and moderate leucocytic reaction around implant within capsule
4 = fibroblastic reaction and intense reaction around implant within capsule The resulting scores were averaged and compared as follows:

| | Impregnated | Control |
|---|---|---|
| No. of Observations | 27 | 24 |
| Average ± S.D. | 2.2 ± 0.8 | 2.2 ± 1.0 |

It is readily apparent from examination of these scores that no greater tissue irritation is caused by the cholesterol impregnated catheters than by the unimpregnated controls.

TABLE IV

| | Total Impregnated ($\Sigma = 34$) | Impregnated from Benzene ($\Sigma = 18$) | Impregnated from Chloroform ($\Sigma = 16$) | Controls ($\Sigma = 32$) |
|---|---|---|---|---|
| Average Scores | Composite = 0.91<br>Lumen = 1.14 | Composite = 0.51<br>Lumen = 0.78 | Composite = 1.4<br>Lumen = 1.6 | Composite = 2.6<br>Lumen = 2.5* |
| Standard Deviation | Composite = ±0.97<br>Lumen = ±0.99 | Composite = ±0.62<br>Lumen = ±0.81 | Composite = ±1.1<br>Lumen = ±1.0 | Composite = ±0.8<br>Lumen = ±0.7 |

*Based on 21 Observed Catheters.

Histological Evaluation

Separate histological evaluation were performed using nine cholesterol impregnated (12 French) catheters and eight control (12 French) catheters which were free of cholesterol. Three separate one-half inch segments of each catheter were implanted subcutaneously in the back of a rabbit for 7 days, then removed and scored individually. The scoring was based on microscopic histological examination using the following scale:

What is claimed is:

1. A urinary catheter of Foley type comprising an elongated tubular shaft of natural rubber having a body insertion portion at one end thereof, said body insertion portion having incorporated therein 2.0 to 20.0 percent by weight cholesterol.

2. The catheter of claim 1 wherein said body insertion portion has incorporated therein 10.0 to 12.0 percent by weight cholesterol.

* * * * *